US012626281B2

(12) United States Patent　　　　　(10) Patent No.:　US 12,626,281 B2

Heymann et al.　　　　　　　　　　　(45) Date of Patent:　　May 12, 2026

(54) SYSTEMS AND METHODS FOR ADJUSTING CONTEXT-DEPENDENT PARAMETERS IN BIDDING FOR ELECTRONIC ADVERTISEMENTS

(71) Applicant: Criteo Technology SAS, Paris (FR)

(72) Inventors: Benjamin Heymann, Paris (FR); Rémi Chan-Renous, Le Pré Saint Gervais (FR); Alexandre Gilotte, Antony (FR)

(73) Assignee: Criteo Technology SAS, Paris (FR)

( * ) Notice: Subject to any disclaimer, the term of this patent is extended or adjusted under 35 U.S.C. 154(b) by 0 days.

(21) Appl. No.: 18/643,228

(22) Filed: Apr. 23, 2024

(65) Prior Publication Data

US 2025/0328930 A1　　　Oct. 23, 2025

(51) Int. Cl.
　　G06Q 30/02　　　　(2023.01)
　　G06Q 30/0273　　　(2023.01)
(52) U.S. Cl.
　　CPC .................................. G06Q 30/0275 (2013.01)
(58) Field of Classification Search
　　CPC ........ G06Q 30/0207–30/0277; G06Q 30/0275
　　See application file for complete search history.

(56) References Cited

U.S. PATENT DOCUMENTS

| | | | |
|---|---|---|---|
| 10,212,468 B1 * | 2/2019 | Sahyoun | H04N 21/23424 |
| 11,308,524 B2 * | 4/2022 | Vasile | G06Q 30/0277 |
| 2006/0095336 A1 * | 5/2006 | Heckerman | G06Q 40/04 |
| | | | 705/26.3 |

| | | | |
|---|---|---|---|
| 2007/0130004 A1 * | 6/2007 | Borgs | G06Q 30/02 |
| | | | 705/14.48 |
| 2008/0052219 A1 * | 2/2008 | Sandholm | G06Q 40/04 |
| | | | 705/37 |
| 2012/0150656 A1 * | 6/2012 | Karidi | G06Q 30/0269 |
| | | | 705/14.66 |
| 2013/0346218 A1 * | 12/2013 | Liu | G06Q 30/02 |
| | | | 705/14.71 |

(Continued)

OTHER PUBLICATIONS

Benjamin Heymann et al: "Repeated Bidding with Dynamic Value", Arxiv.Org, Cornell University Library, 201 Olin Library Cornell University Ithaca, NY 14853, Aug. 3, 2023, XP091584056.

*Primary Examiner* — Thuy N Nguyen

(74) *Attorney, Agent, or Firm* — Cesari and McKenna, LLP

(57)　　　　　　　ABSTRACT

Methods and systems for adjusting context-dependent parameters in bidding for electronic advertisements include identifying a quantity of advertisement displays received by each of a plurality of users during a historical time period, where each user is associated with a random bidding policy. Each user is allocated to a group based upon the advertisement displays received by the user, and a marginal value per dollar spent associated with each different quantity of ad displays received by the plurality of users during the historical time period is estimated. The random bidding policy for each user is adjusted based upon the estimated marginal value per dollar spent. A bid request for an advertisement display opportunity associated with a first user is received, and a bid for the opportunity is determined based upon a characteristic of the opportunity. The determined bid is modified using the adjusted random bidding policy for the first user, and the modified bid is transmitted in response to the bid request.

11 Claims, 4 Drawing Sheets

(56) References Cited

U.S. PATENT DOCUMENTS

| | | | |
|---|---|---|---|
| 2014/0089106 A1* | 3/2014 | Jordan ............... | G06Q 30/0202 |
| | | | 705/14.71 |
| 2014/0136337 A1* | 5/2014 | Ringdahl ........... | G06Q 30/0275 |
| | | | 705/14.71 |
| 2014/0201009 A1* | 7/2014 | Yang .................. | G06Q 30/0273 |
| | | | 705/14.69 |
| 2015/0066661 A1* | 3/2015 | Bhattacharjee ........ | G06Q 30/08 |
| | | | 705/14.71 |
| 2016/0210671 A1* | 7/2016 | Seljan ............... | G06Q 30/0277 |
| 2016/0300262 A1* | 10/2016 | Gao ........................ | H04L 67/53 |
| 2017/0186029 A1* | 6/2017 | Morris .................. | G06Q 50/01 |
| 2017/0193561 A1* | 7/2017 | Shen .................. | G06Q 30/0275 |
| 2018/0174172 A1* | 6/2018 | Hughes .............. | G06Q 30/0205 |
| 2018/0204250 A1* | 7/2018 | Watine .............. | G06Q 30/0275 |
| 2019/0019214 A1* | 1/2019 | Hanegby ............ | G06Q 30/0277 |
| 2019/0130456 A1* | 5/2019 | De La Breteche ...... | G06N 7/01 |
| 2019/0392485 A1* | 12/2019 | Calauzènes ........ | G06Q 30/0277 |
| 2021/0150584 A1* | 5/2021 | Volkovich .......... | G06Q 30/0277 |
| 2023/0368283 A1* | 11/2023 | Wang .................. | G06Q 30/018 |

* cited by examiner

FIG. 2

Bidding Policy Generation

205 Identify a quantity of advertisement displays received by each of a plurality of users during a historical time period, each user associated with a random bidding policy 210 Allocate each of the plurality of users to a user group based upon the quantity of advertisement displays received by the user 215 Estimate a marginal value per dollar spent associated with each different quantity of advertisement displays 220 Adjust the random bidding policy for each user based upon the estimated marginal value per dollar spent

Bidding Policy Deployment

225 Receive a bid request for an available advertisement display opportunity associated with a first user 230 Determine a bid for the available advertisement display opportunity based upon at least one characteristic of the opportunity 235 Modify the determined bid using the adjusted random bidding policy for the first user 240 Transmit the modified bid to an advertising exchange computing device in response to the bid request

| Quantity of Ad Displays (x) | Bucket Number | Bid Adjustment |
|---|---|---|
| 1 ≤ x ≤ 2 | 0 | 1.20 |
| 3 ≤ x ≤ 7 | 1 | 1.20 |
| 8 ≤ x ≤ 32 | 2 | 1.20 |
| 33 <= x <= 127 | 3 | 0.94 |
| 128 <= x <= 512 | 4 | 0.80 |
| ... | ... | ... |

*Production Bidding Policy Modifiers*

FIG. 4

SYSTEMS AND METHODS FOR ADJUSTING CONTEXT-DEPENDENT PARAMETERS IN BIDDING FOR ELECTRONIC ADVERTISEMENTS

TECHNICAL FIELD

The present technology relates to electronic advertisements and, more particularly, to techniques for adjusting context-dependent parameters in bidding for electronic advertisements.

BACKGROUND

Publisher systems can provide webpages or other online content that can include one or more advertisement display opportunities for computerized graphical advertisement displays (e.g., space for a banner advertisement across the top of the webpage, within an application, or within other media such as videos or images). In some instances, when a user device (e.g., a computer running a web browser) processes a webpage for display, the user device can request, from an ad system, graphical display source code for a computerized graphical advertisement display for one of the advertisement display opportunities. The ad system can provide the graphical display source code to the user device to render and/or display.

As part of the advertisement selection process, the ad system communicates with real-time bidding (RTB) computing platforms. The RTB platforms receive bids from various third-party bidding agent systems (also called demand-side platforms (DSP)) that submit bids for the advertisement display opportunity on behalf of advertisers. Typically, the bidding agent systems are responsible for generating a bid for advertisement opportunities that meet the advertiser's requirements, such as cost, value, and audience considerations. The RTB platforms coalesce the bids received from the various DSPs and determine whether the advertisement display opportunity is selected after analyzing the received bids.

As can be appreciated, it is largely accepted that showing too many displays to the same user generates 'display fatigue.' In other words, the value of one additional display decreases with the number and/or frequency of the previous displays. A common practice in the industry is to use 'fatigue' variables in the prediction models, such as counter of past displays on the same user to improve the predictions. However, an optimal bidding policy should also foresee that display fatigue reduces the value of the next displays on the same user-notably because of the users' fatigue. While is true that classical machine learning models can predict how previously won auctions decrease the current opportunity value, these methodologies are not enough to produce a bid that correctly accounts for how winning the current auction shall impact the future values. Indeed, under this perspective, most bidders in existing advertisement bidding systems are impatient, in that they do not fully account for the repeated nature of the auctions. Unsurprisingly, impatience induces a cost—and failure to properly account for this cost results in reduced value and efficiency in generating advertisement displays.

SUMMARY

Accordingly, there is a need for technology to adjust opportunity value estimates (such as bids) dynamically in the computerized advertisement bidding process to mitigate the cost of impatience using a bidding policy learning step. The methods and systems described herein advantageously exploit data collected with a randomized bidding policy, and modify the policy to account for the future display opportunities of the user.

In one aspect, there is a computerized method of adjusting context-dependent parameters in bidding for electronic advertisements. A bid determination computing device identifies a quantity of advertisement displays received by each of a plurality of users during a historical time period, the advertisement displays for each user associated with a random bidding policy. The bid determination computing device allocates each of the plurality of users to a user group based upon the corresponding quantity of advertisement displays received by the user during the historical time period. The bid determination computing device estimates a marginal value per dollar spent associated with each different quantity of ad displays received by the plurality of users during the historical time period. The bid determination computing device adjusts the random bidding policy for each user based upon the estimated marginal value per dollar spent for the quantity of ad displays received by the user during the historical time period. The bid determination computing device receives, from an advertisement exchange computing device, a bid request for an available advertisement display opportunity during rendering of a webpage, the bid request associated with a first user of the plurality of users. The bid determination computing device determines a bid for the available advertisement display opportunity based upon at least one characteristic of the available advertisement display opportunity. The bid determination computing device modifies the determined bid using the adjusted random bidding policy. The bid determination computing device transmits the modified bid to the advertising exchange computing device in response to the bid request.

In another aspect, there is a computer system for adjusting context-dependent parameters in bidding for electronic advertisements. The system includes a bid determination computing device that has a memory for storing computer-executable instructions and a processor that executes the computer-executable instructions. The bid determination computing device identifies a quantity of advertisement displays received by each of a plurality of users during a historical time period, the advertisement displays for each user associated with a random bidding policy. The bid determination computing device allocates each of the plurality of users to a user group based upon the corresponding quantity of advertisement displays received by the user during the historical time period. The bid determination computing device estimates a marginal value per dollar spent associated with each different quantity of ad displays received by the plurality of users during the historical time period. The bid determination computing device adjusts the random bidding policy for each user based upon the estimated marginal value per dollar spent for the quantity of ad displays received by the user during the historical time period. The bid determination computing device receives, from an advertisement exchange computing device, a bid request for an available advertisement display opportunity during rendering of a webpage, the bid request associated with a first user of the plurality of users. The bid determination computing device determines a bid for the available advertisement display opportunity based upon at least one characteristic of the available advertisement display opportunity. The bid determination computing device modifies the determined bid using the adjusted random bidding policy.

The bid determination computing device transmits the modified bid to the advertising exchange computing device in response to the bid request.

Any of the above aspects can include one or more of the following features. In some embodiments, the at least one characteristic of the available advertisement display opportunity is a characteristic received from the ad exchange computing device that submitted the corresponding bid request. In some embodiments, the at least one characteristic is associated with a publisher of the available advertisement display opportunity. In some embodiments, the at least one characteristic of the available advertisement display opportunity is a URI associated with the available advertisement display opportunity. In some embodiments, the at least one characteristic of the available advertisement display opportunity is a time of day associated with the bid request. In some embodiments, the at least one characteristic of the available advertisement display opportunity is a user identifier associated with the available advertisement display opportunity. In some embodiments, the at least one characteristic of the available advertisement display opportunity is a display format of the available advertisement display opportunity.

In some embodiments, the ad exchange computing device is a real-time bidding platform, an ad server, a computing device executing an auction for the available advertisement display opportunity within a browser, or a computing device executing an auction for the available advertisement display opportunity within a mobile application. In some embodiments, the marginal value per dollar spent is a marginal cost of ecpm (expected cost per mile). In some embodiments, the advertising exchange computing device determines that the modified bid wins an auction for the available advertisement display opportunity and generates an advertisement display for presentation to the first user on a remote computing device using the modified bid.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 2 depicts a flow chart for predictive adjusted bidding for electronic advertisements.

FIG. 4 is a diagram of a table used for modifying a bidding policy based upon cost of impatience.

DETAILED DESCRIPTION

The present technology provides systems and methods for adjusting context-dependent parameters in bidding for electronic advertisements, particularly computerized graphical display advertisements. Although the technology is illustrated and described herein with reference to specific embodiments, the technology is not intended to be limited to the details shown. Various modifications can be made in the details within the scope the claims and without departing from the technology.

Figure 1:
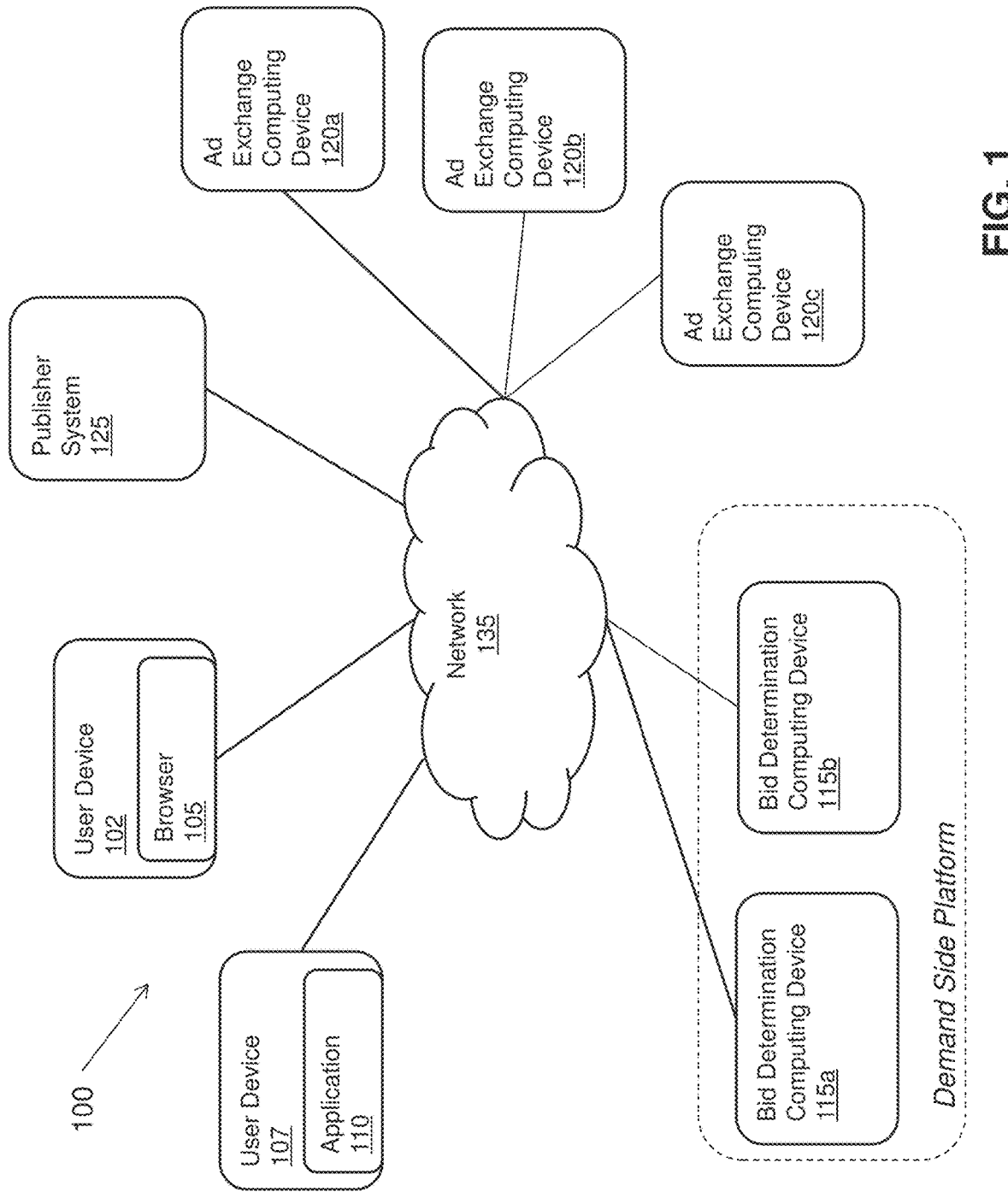
FIG. 1 is a diagram of a networked system in accordance with embodiments of the technology.

FIG. 1 is a diagram of a networked system 100 in accordance with embodiments of the technology. As illustrated, networked system 100 can include user device 102, user device 107, bid determination computing devices 115*a*, 115*b* (which collectively can comprise a demand side platform (DSP)), ad exchange computing devices 120*a*, 120*b*, 120*c*, and publisher system 125. User device 102, user device 107, bid determination computing devices 115*a*, 115*b*, ad exchange computing devices 120*a*, 120*b*, 120*c*, and publisher system 125 can be in data communication via network 135. User devices 102 and 107 can each be any computing devices. In some embodiments, user devices 102 and 107 can each be one of a mobile computing device (e.g., cellular phones and/or tablets), a PC, or other computing device. User device 102 executes web browser 105. User device 107 executes application 110 (e.g., a mobile application that interacts with online content).

Bid determination computing devices 115*a*, 115*b* can be any computing device, such as a server or multiple servers. In some embodiments, bid determination computing devices 115*a*, 115*b* can receive bid requests from one or more of ad exchange computing devices 120*a*, 120*b*, 120*c* and generate opportunity value estimates, such as bids, on behalf of advertisers. The bid determination computing devices 115*a*, 115*b* then submit the bids to the respective ad exchange computing devices 120*a*, 120*b*, 120*c* in response to the bid requests. In some embodiments, the bid determination computing devices and ad exchange computing devices communicate using a specialized application programming interface (API), using specifically-formatted data requests and responses. Network 135 can be any network or multiple networks. For example, network 135 can include cellular networks through which user devices 102 and 107 are connected and the Internet.

Ad exchange computing devices 120*a*, 120*b*, 120*c* can be any computing device, such as a server or multiple servers, each of which can be operated by a different entity. In some embodiments, ad exchange computing devices 120*a*, 120*b*, 120*c* can perform auctions for advertising display opportunities in online media, such as webpages or application content served by publisher system 125, that are provided to user devices 102 and/or 107. Bid determination computing devices 115*a*, 115*b* can submit bids for such advertising display opportunities on behalf of advertisers, and if a bid determination computing device wins the auction, it can provide source code or other display data for a computerized graphical advertisement display to fill the advertising display opportunity. Publisher system 125 can be any computing device, such as a server or multiple servers. In some embodiments, publisher system 125 can serve webpages to browser 105. In some embodiments, publisher system 125 can serve other content to application 110. In some embodiments, publisher system 125 can communicate with bid determination computing devices 115*a*, 115*b* to determine whether bid determination computing devices 115*a*, 115*b* will provide source code for a computerized graphical advertisement display to fill an advertisement display opportunity in a webpage or application content.

FIG. 2 is a flow diagram of a computerized method of predictive adjusted bidding for electronic advertisements, using system 100 of FIG. 1. A publisher system (e.g., publisher system 125) receives a request for graphical display source code for a computerized graphical advertisement display to be inserted into one or more available advertising display opportunities (also called impression opportunities) on a webpage (e.g., during rendering of a webpage and/or during playback of a video). For example, the advertising display opportunities can correspond to ad space on a particular webpage, such as a banner display ad. The request can be received from a browser or other application executing on a user device (e.g., browser 105 on user device 102) on which the webpage is displayed. Publisher system 125 transmits the request to one or more of ad exchange computing devices 120a, 120b, 120c. In some embodiments, publisher system 125 transmits a request relating the same underlying advertising display opportunity to multiple ad exchange computing devices, or in some cases, publisher system 125 transmits multiple requests relating to the same underlying advertising display opportunity to a single ad exchange computing device (for example, each of the multiple requests may involve a different floor price). Ad exchange computing devices 120a, 120b, 120c that received a request from publisher device 125 transmit a bid request to bid determination computing devices 115a, 115b at the DSP for requisition of a corresponding bid for the available underlying advertising display opportunity.

In order to generate an appropriate bid for the advertising display opportunity, bid determination computing devices 115a, 115b are configured to generate and utilize a bidding policy for each user (or groups of users) that has been adjusted to account for a cost of impatience (also called a 'cost of rush'). As can be appreciated, as more and more advertisements are displayed to a given user (and/or a frequency of advertisements displayed to the user are increasing), that user may suffer from 'fatigue' with respect to the advertisement. This fatigue may be quantified in each subsequent advertisement display having a reduced value in relation to the previous displays. As a result, advertisers will want to understand the effect the fatigue has on subsequent advertising opportunities for that user so the advertisers can create a bidding policy that maximizes the expected value for each opportunity. Generally, the method described herein comprises two phases: bidding policy generation, where the optimized bidding policy that accounts for the cost of impatience (cost of rush) is created; and bidding policy deployment, where the optimized bidding policy is applied to a production bidding environment for the adjustment of bids in real time for advertisement displays targeted to specific users.

The creation of the bidding policy begins, at step 205, where the bid determination computing device identifies a quantity of advertisement displays received by each of a plurality of users during a historical time period. As described above, through typical use of computing devices for activities such as web browsing, each user receives a number of advertisement displays. This number is tracked (e.g., by bid determination computing device(s) 115a, 115b) for a defined time period, such as the past 30 days, 60 days, 90 days, etc. For example, a given user may have received zero advertisement displays at time t0 (i.e., the beginning of the tracking period). As the user performs the above activities during the designated time period, the user will receive advertisement displays. Then, at time t1 (i.e., the end of the tracking period), the bid determination computing device 115a, 115b identifies the quantity of advertisement displays that were presented to the user during the time period.

For example, in one embodiment the bid determination computing device 115a, 115b sets the historical time period for tracking to 90 days. During this time period, the bid determination computing device 115a, 115b allocates a counter for each user that is incremented each time an advertisement display is generated and presented to that user. Then, during bidding policy generation, the bid determination computing device 115a, 115b can identify the quantity of advertisement displays received by each user during the time period using the counter value. It should be appreciated that other methods for tracking the quantity of advertisement displays received by a user can be used within the scope of the technology described herein.

After creating the user groups, at step 215 the bid determination computing device 115a, 115b assigns a random bidding policy to each user group. In some embodiments, the bid determination computing device 115a, 115b are configured to randomize a parameter $\Theta$ of the bidder, by drawing for each user $i \in [1 \ldots n]$ a randomized value $\theta i$ from a log normal distribution of parameters $\mu$ and $\sigma$. $\theta i$ is a factor on the output bid: each bid for user i is multiplied by $\theta i$, $\sigma = 0.1$ and $\mu$ was set such that $E(\theta) = 1$; mi is a quantity of interest for a given user i (such as the cost or the value generated by the won auctions); and we set $M(S) = \Sigma_{i \in S} m_i$ for any set $S \subseteq [1 \ldots n]$.

As can be appreciated, randomization allows for counterfactual estimation of outcomes when the bidder changes the policy, and draws $\Theta$ from another distribution. This counterfactual estimation relies on the importance weighting estimators described below. More precisely, let $M(S, \alpha)$ be the expected value taken by $M(S)$ when the lognormal random parameter $\Theta$ of each bidder is multiplied by $\alpha$, i.e.:

$$M(S, \alpha) := \mathbb{E}_{\Theta \sim a \times Lognormal(\mu, \sigma)}[M(S)]$$

For the importance weighting estimators, let $\subseteq [1 \ldots n]$ independent from $\Theta$ and $\alpha > 0$, then $$\hat{M}(S, \alpha) := \sum_{i \in S} m_i \times \exp\left(\frac{2\ln(\alpha)(\ln(\theta_i) - \mu) - \ln(\alpha)^2}{2\sigma^2}\right)$$

is an unbiased estimator of $M(S, \alpha)$.

Because the set of users S must be defined independently of the random factor $\Theta$ for the proposition to hold, that, we split the users in groups depending on their state (i.e., their fatigue variable of quantity of advertisement displays in the past 90 days) at the beginning of the data collection.

However, for bidding policy changes significantly larger than the standard deviation of the random exploration, estimator $\hat{M}(S, \alpha)$ as set forth above has a large variance. To avoid this variance, we used a linearized version of the importance weighting estimator. This linearized estimator trades of the variance for some bias, which we can expect to be reasonably small if the outcome is sufficiently regular with respect to the policy. This linearized estimator is obtained by computing the derivative $\partial M(S, \alpha)/\partial \alpha$ at $\alpha = 1$ instead of directly using the estimator $\hat{M}(S, \alpha)$. This is possible by taking the derivative with respect to $\alpha$ at $\alpha = 1$, as in the following proposition:

Let $S \subseteq [1 \ldots n]$ independent from the $\theta i$ and $\alpha > 0$, set $$\partial \hat{M}(S) := \sum_{i \in S} m_i \times \frac{\ln(\theta_i) - \mu}{\sigma^2},$$

then $\widehat{DM}$ (S) is an unbiased estimator of the derivative of $\alpha \rightarrow M(S,\alpha)$ at $\alpha=1$.

Figure 3:
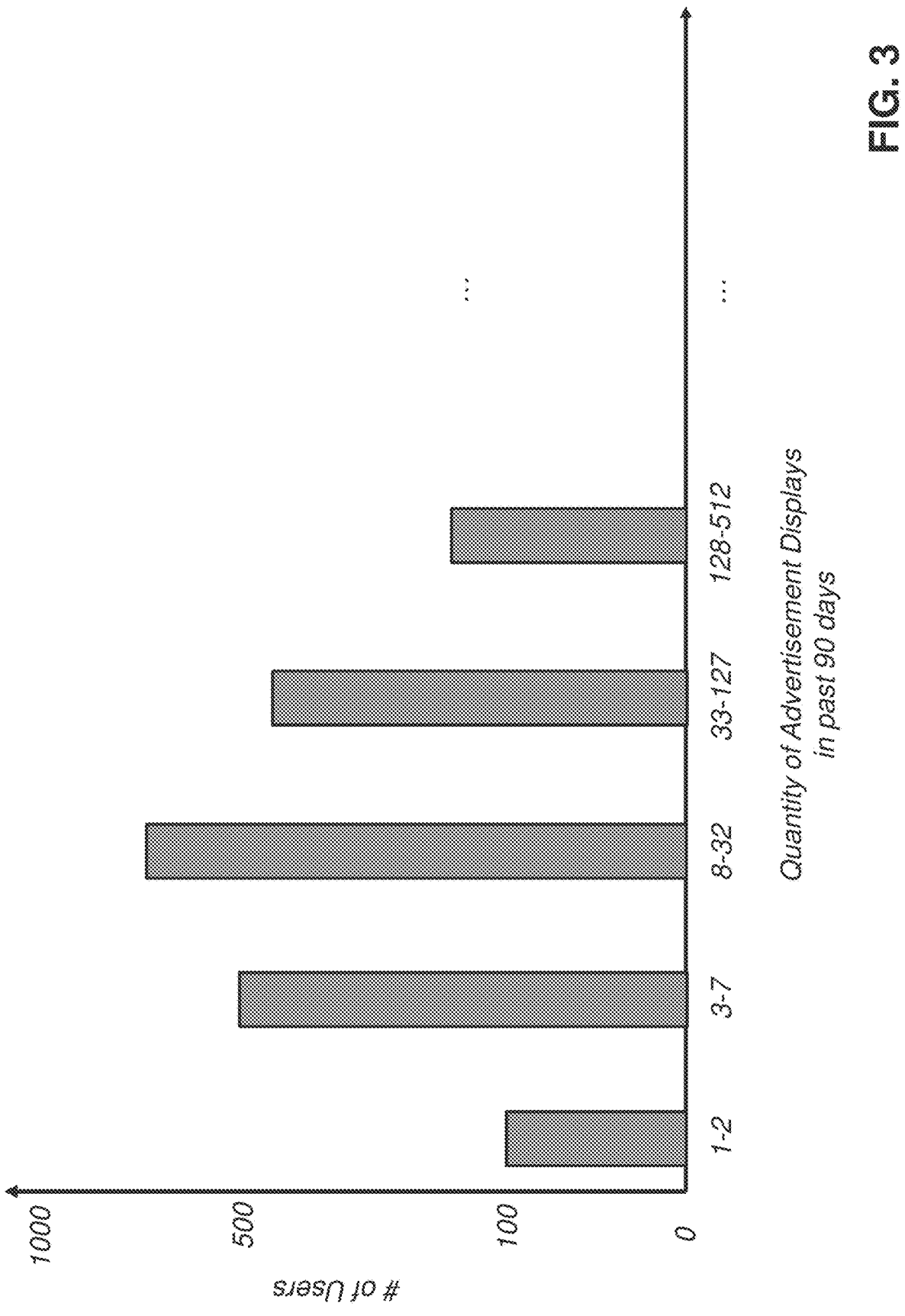
FIG. 3 is a diagram of an exemplary user group allocation structure.

Once the quantity of advertisement displays and random bidding factor has been identified for each user, at step 210 the bid determination computing device 115a, 115b allocates each of the plurality of users to a user group based upon the quantity of advertisement displays received by the user. In some embodiments, the bid determination computing device 115a, 115b creates different user groups based upon the quantity according to a defined granularity—e.g., users that have received 1-2 advertisement displays during the historical time period are allocated to a first group, users that have received 3-7 advertisement displays during the historical time period are allocated to a second group, and so forth. FIG. 3 is a diagram of an exemplary user group allocation structure. As shown in FIG. 3, the graph depicts the number of users allocated to each group (or bucket) of advertisement displays in the past 90 days. For example, there are 100 users that received 1-2 advertisement displays in the past 90 days.

Then, at step 215 the bid determination computing device 115a, 115b estimates a marginal value per dollar spent associated with each different quantity of advertisement displays associated with each different quantity of ad displays received by the plurality of users during the historical time period. As can be appreciated, given two quantities of interest V and C, where V is some form of value observed in the outcome, and C is the money spent by the bidder, we can now compute the marginal return on investment (ROI) on a given scope. Indeed, by the chain rule and equation 3 above, we have the following proposition:

Let $S \subseteq [1 \ldots n]$ independent from $\theta i$ and $\alpha > 0$, set $$mROI(S) = \frac{\widehat{DV}(S)}{\widehat{DC}(S)}$$

then mROI(S) is a consistent estimator of the marginal ROI on S. The marginal ROI can be interpreted as the incremental value $\Delta V$ the bidder gets from S by spending one additional unit of money on S. In some embodiments, the bid determination computing device 115a, 115b estimates the marginal cost of ecpm (effective cost per mile) associated with each different quantity of advertisement displays using the above methodology.

Continuing with FIG. 2, at step 220 the bid determination computing device 115a, 115b adjusts the random bidding policy for each user based upon the estimated marginal value per dollar spent for the quantity of ad displays received by the user during the historical time period. For example, the bid determination computing device 115a, 115b is configured to modify one or more aspects of the bidding policy used to generate bids for real-time advertisement displays for a given user based upon the estimated marginal value per dollar spent as calculated above. In some embodiments, it is assumed that the bidder's task is to maximize the value VI for a given budget B:

$$\max_{\pi} V_{\pi}$$

$$\text{s.t. } C_{\pi} \leq B$$

where $V\pi$ and $C\pi$ are the overall value and spend generated by the bidder's policy.

Therefore, if there are two sets of users $S_1$ and $S_2$ such that $$S_1 \cap S_2 = \emptyset \text{ and}$$

$$mROI(S_1) \leq mROI(S_2),$$

then the bidder can improve the criterion by rebalancing some budget from $S_1$ to $S_2$. Said otherwise, if two groups of users have different marginal ROIs, the value can be increased by spending more on the users with a high ROI and less on users with a smaller ROI.

More generally, suppose there is a clustering S1, S2 . . . . Sk of [1 . . . n] such that $$mROI(S_i) \leq mROI(S_{i+1}), \forall_i \in [1, k-1].$$

A naive idea could be to increase the factor $\alpha$ to a high value on Sk and to decrease it everywhere else. This is obviously not a wise idea: the mROI only tells what happens for small perturbations of the parameter $\Theta$. In practice the marginal ROI is usually a decreasing function of the spend, so that at some point Sk will not be the best cluster to spend on. In view of this, the bid determination computing device 115a, 115b utilizes a straightforward decision rule that consists of capping $\alpha$ in a reasonable range around 1 on the different clusters, and then to choose for each cluster S a value $\alpha S$ within this range such that, according to the linearized estimator, the total cost variation $$\sum_{S} \sum_{i \in S} (\alpha_S - 1) \cdot c_i \cdot \frac{\log(\theta_i) - \mu}{\sigma^2}$$

is 0 and the total value is maximized.

FIG. 4 is a diagram of a table used for modifying a bidding policy based upon cost of impatience as calculated above. As shown in FIG. 4, each bucket (denoted by column 402) corresponds to a quantity of advertisement displays (x) (column 404) received by users in the bucket over the last 90 days and a bid adjustment value (column 406). As can be appreciated, the bid adjustment value is used by bid determination computing devices 115a, 115b to modify incoming bids for particular users during advertisement display generation. For example, users in bucket number 0 will have corresponding bids modified by a weight of 1.20 (thereby increasing the bid amount(s)) while users in bucket number 4 will have corresponding bids modified by a weight of 0.80 (thereby decreasing the bid amount(s)). The adjusted bidding policy is then deployed to a production bidding environment such that the bid determination computing devices 115a, 115b utilize the adjusted bidding policy to generate bids for subsequent bid requests received from, e.g., ad exchange computing devices 120a, 120b, 120c for advertisement display opportunities targeted to particular users.

The bid determination computing device 115a, 115b can receive bid requests for real-time advertisement display opportunities and use the adjusted bidding policy to dynamically modify bids generated based upon the bid requests. At step 225, one or more of the bid determination computing devices 115a, 115b receives a bid request for an available advertisement display opportunity associated with a first user. As mentioned previously, a user at user device 102 can browse one or more webpages with available advertisement displays. A publisher system (e.g., publisher system 125) receives a request for graphical display source code for a computerized graphical advertisement display to be inserted into one or more available advertising display opportunities (also called impression opportunities) on a webpage (e.g., during rendering of a webpage and/or during playback of a video). For example, the advertising display opportunities can correspond to ad space on a particular webpage, such as a banner display ad. The request can be received from a browser or other application executing on a user device (e.g., browser 105 on user device 102) on which the webpage is displayed. Publisher system 125 transmits the request to one or more of ad exchange computing devices 120*a*, 120*b*, 120*c*. In some embodiments, publisher system 125 transmits a request relating the same underlying advertising display opportunity to multiple ad exchange computing devices, or in some cases, publisher system 125 transmits multiple requests relating to the same underlying advertising display opportunity to a single ad exchange computing device (for example, each of the multiple requests may involve a different floor price). Ad exchange computing devices 120*a*, 120*b*, 120*c* that received a request from publisher device 125 transmit a bid request to bid determination computing devices 115*a*, 115*b* at the DSP for requisition of a corresponding bid for the available underlying advertising display opportunity.

Upon receiving the bid request, at step 230 bid determination computing device 115*a*, 115*b* determines a bid (also called an opportunity value estimate) for the available advertisement display opportunity that is identified in the bid request. Generally, the bid determination computing device provides an opportunity value estimate on behalf of an advertiser that wishes to insert a graphical advertisement into the impression opportunity on the webpage. The bid determination computing device uses one or more data elements contained in the bid request message (e.g., such as characteristics associated with the available underlying impression opportunity and/or bid request) to generate an opportunity value estimate (also called a bid) that is responsive to the request for submission to the ad exchange computing device that provided the bid request. Exemplary characteristics include, but are not limited to, characteristics associated with a publisher of the impression opportunity, a URI associated with the impression opportunity, a time of day associated with the bid request, a user identifier associated with the impression opportunity, and a format of impression associated the impression opportunity. In some embodiments, the bid determination computing device 115*a* determines an expected profitability of the available underlying impression opportunity associated with the received bid request, when a bid placed in response to the bid request would win the available underlying impression opportunity, using one or more of: a characteristic of the bid request or a predicted profitability based upon information from prior similar bid requests.

At step 235, the bid determination computing device adjusts the generated bid for the available advertisement display opportunity using the adjusted production bidding policy. For example, as mentioned above, the bid determination computing device determines that the first user belongs to a particular user group that has been presented with a particular quantity of advertisement displays during the past 90 days. Based upon the identity of the user group, the bid determination computing device applies the production bidding policy to modify the generated bid according to the marginal value per dollar spent associated with the user group. For example, if the marginal value per dollar spent for the user group is higher than an estimated profitability for the present bid request, the bid determination computing device can adjust the bid that is responsive to the present bid request so that it is less likely to win the auction. In some embodiments, the bid determination computing device adjusts the bid to zero-indicating that the computing device prefers not to win the auction. For instance, one bidding strategy consists in bidding if and only if the expected profit when the bid is submitted is greater than the expected profit if the bid is not submitted. Another bidding strategy consists in bidding proportionally to the inverse of the expected number of bid requests for the same opportunity.

At step 240, the bid determination computing device 115*a* transmits the modified bid to the ad exchange computing device (e.g., device 120*a*) in response to the bid request. If the modified bid submitted by the bid determination computing device 115*a* is selected by the ad exchange computing device 120*a* as the winning bid, the ad exchange computing device generates graphical display source code to be inserted into the available impression opportunity. The ad exchange computing device transmits the graphical display source code to the publisher system 125 for display on the user device.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the technology by operating on input data and generating output. Method steps can also be performed by, and apparatus can be implemented as, special purpose logic circuitry, e.g., an FPGA (field programmable gate array) or an ASIC (application specific-integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above-described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above-described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact through a communication network. The relationship of client and server arises by virtue of computer programs running on the respective computers and having a client-server relationship to each other.

The technology has been described in terms of particular embodiments. The alternatives described herein are examples for illustration only and not to limit the alternatives in any way. The steps of the technology can be performed in a different order and still achieve desirable results. Other embodiments are within the scope of the following claims.

What is claimed is:

1. A computerized method of adjusting context-dependent parameters in bidding for electronic advertisements during loading of a webpage, the method comprising:

identifying, by a bid determination computing device, a quantity of advertisement displays received by each of a plurality of users during a historical time period;

allocating, by the bid determination computing device, each of the plurality of users to a user group based upon the corresponding quantity of advertisement displays received by the user during the historical time period;

determining, by the bid determination computing device, a random bidding factor for each of the plurality of users using a linearized importance weighting estimator algorithm;

estimating, by the bid determination computing device, a marginal value per dollar spent associated with each different quantity of advertisement displays received by the plurality of users during the historical time period;

adjusting, by the bid determination computing device, the random bidding factor for each user based upon the estimated marginal value per dollar spent for the quantity of advertisement displays received by the users in the corresponding user group during the historical time period, including capping the random bidding factor for each user in a particular user group according to a defined range that minimizes a total cost variation of bids and maximizes a total value of bids;

receiving, by an advertisement exchange computing device from a software application of a requesting client device, during loading of a webpage by the client device, a first request for graphical display source code corresponding to a computerized graphical advertisement display to be inserted into one or more advertisement display opportunities on the webpage;

transmitting, by the advertisement exchange computing device to the bid determination computing device, during loading of the webpage by the client device, a bid request for an available advertisement display opportunity of the one or more advertisement display opportunities on the webpage, the bid request associated with a first user of the plurality of users;

determining, by the bid determination computing device, during loading of the webpage by the client device, a bid for the available advertisement display opportunity based upon at least one characteristic of the available advertisement display opportunity;

dynamically modifying, by the bid determination computing device, during loading of the webpage by the client device, the determined bid using the adjusted random bidding factor for the first user;

transmitting, by the bid determination computing device, during loading of the webpage by the client device, the modified bid to the advertising exchange computing device in response to the bid request;

determining, by the advertisement exchange computing device, during loading of the webpage by the client device, whether to select the available advertising display opportunity based upon the modified bid; and generating, by the advertisement exchange computing device, during loading of the webpage by the client device and based upon the modified bid, graphical display source code corresponding to the computerized graphical advertisement display to be inserted into the available advertisement display opportunity upon completion of loading of the webpage.

2. The method of claim 1, wherein the at least one characteristic of the available advertisement display opportunity is a characteristic received from the advertisement exchange computing device that submitted the corresponding bid request.

3. The method of claim 2, wherein the at least one characteristic is associated with a publisher of the available advertisement display opportunity.

4. The method of claim 2, wherein the at least one characteristic of the available advertisement display opportunity is a URI associated with the available advertisement display opportunity.

5. The method of claim 2, wherein the at least one characteristic of the available advertisement display opportunity is a time of day associated with the bid request.

6. The method of claim 2, wherein the at least one characteristic of the available advertisement display opportunity is a user identifier associated with the available advertisement display opportunity.

7. The method of claim 2, wherein the at least one characteristic of the available advertisement display opportunity is a display format of the available advertisement display opportunity.

8. The method of claim 1, wherein the advertisement exchange computing device is a real-time bidding platform, an ad server, a computing device executing an auction for the available advertisement display opportunity within a browser, or a computing device executing an auction for the available advertisement display opportunity within a mobile application.

9. The method of claim 1, wherein the marginal value per dollar spent is a marginal cost of ecpm (expected cost per mile).

10. The method of claim 1, wherein the advertisement exchange computing device determines that the modified bid wins an auction for the available advertisement display opportunity and generates the graphical display source code corresponding to the computerized graphical advertisement display to be inserted into the available advertisement display opportunity in the webpage upon completion of loading of the webpage.

11. A system for adjusting context-dependent parameters in bidding for electronic advertisements during loading of a webpage, the system comprising a bid determination computing device having a memory that stores computer-executable instructions and a processor that executes the computer-executable instructions to:

identify, by the bid determination computing device, a quantity of advertisement displays received by each of a plurality of users during a historical time period;

allocate, by the bid determination computing device, each of the plurality of users to a user group based upon the corresponding quantity of advertisement displays received by the user during the historical time period;

determine, by the bid determination computing device, a random bidding factor for each of the plurality of users using a linearized importance weighting estimator algorithm;

estimate, by the bid determination computing device, a marginal value per dollar spent associated with each different quantity of advertisement displays received by the plurality of users during the historical time period;

adjust, by the bid determination computing device, the random bidding policy for each user based upon the estimated marginal value per dollar spent for the quantity of advertisement displays received by the users in the corresponding user group during the historical time period, including capping the random bidding factor for each user in a particular user group according to a defined range that minimizes a total cost variation of bids and maximizes a total value of bids;

receive, by an advertisement exchange computing device from a software application of a requesting client device, during loading of a webpage by the client device, a first request for graphical display source code corresponding to a computerized graphical advertisement display to be inserted into one or more advertisement display opportunities on the webpage;

transmit, by the advertisement exchange computing device to the bid determination computing device, during loading of the webpage by the client device, a bid request for an available advertisement display opportunity of the one or more advertisement display opportunities on the webpage, the bid request associated with a first user of the plurality of users;

determine, by the bid determination computing device, during loading of the webpage by the client device, a bid for the available advertisement display opportunity based upon at least one characteristic of the available advertisement display opportunity;

dynamically modify, by the bid determination computing device, during loading of the webpage by the client device, the determined bid using the adjusted random bidding policy for the first user;

transmit, by the bid determination computing device, during loading of the webpage by the client device, the modified bid to the advertising exchange computing device in response to the bid request;

determine, by the advertisement exchange computing device, during loading of the webpage by the client device, whether to select the available advertising display opportunity based upon the modified bid; and generate, by the advertisement exchange computing device, during loading of the webpage by the client device and based upon the modified bid, graphical display source code corresponding to the computerized graphical advertisement display to be inserted into the available advertisement display opportunity upon completion of loading of the webpage.

* * * * *